United States Patent [19]
Hamilton

[11] Patent Number: 5,922,816
[45] Date of Patent: Jul. 13, 1999

[54] POLYESTER-POLYCARBONATE COMPOSITIONS STABILIZED AGAINST ESTER-CARBONATE INTERCHANGE

[75] Inventor: Douglas George Hamilton, Mt. Vernon, Ind.

[73] Assignee: General Electric Company, Pittsfield, Mass.

[21] Appl. No.: 08/425,310

[22] Filed: Apr. 17, 1995

Related U.S. Application Data

[63] Continuation of application No. 07/892,077, Jun. 2, 1992., abandoned

[51] Int. Cl.$^6$ ........................................... C08F 20/00

[52] U.S. Cl. .................... 525/446; 525/479; 525/460; 525/140; 525/141; 525/145

[58] Field of Search ................................. 515/439, 446, 515/460; 525/140, 141, 145

[56] References Cited

U.S. PATENT DOCUMENTS

| | | | |
|---|---|---|---|
| 3,441,450 | 4/1969 | Mueller | 524/145 |
| 3,546,177 | 12/1970 | Mueller | 524/145 |
| 4,125,551 | 11/1978 | Petersen | 556/405 |
| 4,401,804 | 8/1983 | Wooten et al. | 528/272 |
| 4,532,290 | 7/1985 | Jaquiss et al. | 524/417 |
| 5,041,586 | 8/1991 | Beck et al. | 556/405 |

*Primary Examiner*—Robert Dawson

[57] ABSTRACT

A polyester-polycarbonate composition comprising (A) at least one polyester prepared by the reaction of at least one alkenediol with at least one dicarboxylic acid or dialkyl ester thereof in the presence of a metallic catalyst, (B) at least one polycarbonate, (C) at least one silyl phosphate, the silyl phosphate being present in an amount effective to inhibit ester-carbonate interchange in the composition, optionally, (D) an organic or inorganic colorant, particularly, acid sensitive organic or inorganic colorants, (E) an impact modifier, and (F) a stabilizer. A method for stabilizing polyester-polycarbonate compositions against ester-carbonate interchange is also provided.

22 Claims, No Drawings

POLYESTER-POLYCARBONATE COMPOSITIONS STABILIZED AGAINST ESTER-CARBONATE INTERCHANGE

This is a continuation of application Ser. No. 07/892,077 filed on Jun. 2, 1992 and now abandoned.

BACKGROUND OF THE INVENTION

The present invention relates to polycarbonate-polyester compositions. More particularly, the present invention relates to improved polyester-polycarbonate compositions stabilized against ester-carbonate interchange between the polyester and the polycarbonate.

Polyester-polycarbonate compositions are widely used in industry. However, a disadvantage of these compositions is their tendency to undergo ester-carbonate interchange, wherein ester linkages in both the polycarbonate and the polyester are broken and replaced by alkylene carbonate and aryl carboxylate bonds. The result is degradation of the physical properties of the polymers due to hybridization of the molecular linkages therein. This in turn leads to variability in the final fabricated article.

It is believed that the ester-carbonate interchange in polyester-polycarbonate compositions is promoted by metallic catalyst residues present in the polyester. These residues are left over from the polymerization reaction forming the polyester, wherein certain metal compounds are used as polymerization catalysts. It appears, however, that these metal compounds also catalyze the transesterification reaction between the polycarbonate and the polyester.

It would be desirable to provide a compound which deactivates the metallic catalyst residues present in the polycarbonate/polyester compositions. The resulting polyester-polycarbonate compositions would be improved in that they would have a decreased tendency to undergo ester-carbonate interchange and therefore would be stable against such interchange.

Although methods for deactivating metallic catalyst residues in polyester-polycarbonate compositions are known in the art, as described hereinbelow, it is continually desirable to provide alternative methods for deactivating such residues.

It is known in the art that certain phosphorous-containing compounds are useful in deactivating metallic catalyst residues. Reference is made, for example, to U.S. Pat. Nos. 4,532,290 (Jaquiss et al.) and 4,401,804 (Wooten et al.). Examples of such phosphorous-containing compounds include phosphoric acid, certain organic phosphorous compounds such as distearyl pentaerythritol diphosphate, mono- or dihydrogen phosphonate or mono-, di-, or trihydrogen phosphate compounds, or di- and triester phosphonate compounds, phosphite compounds, and certain inorganic phosphorous compounds, such as monosodium phosphate and monopotassium phosphate, alone or in combination.

Certain of these phosphorous-containing compounds, e.g., phosphoric acid, have the drawback of reacting with and neutralizing acid-sensitive pigments, dyes or other coloring agents added to the polycarbonate/polyester compositions, thereby leaving the composition with an undesirable color.

It would be desirable to provide a compound which deactivates the metallic catalyst residues present in the polycarbonate/polyester compositions without reacting with and neutralizing acid-sensitive pigments or dyes added to the compositions.

The present invention is based on the discovery that certain silyl phosphates will effectively deactivate metallic catalyst residues in a polycarbonate-polyester composition, without neutralizing acid-sensitive pigments or dyes added to the polymer composition. The silyl phosphates used in this invention will inhibit the ester-carbonate interchange promoted between the polyester and the polycarbonate by the metallic catalyst residues.

None of the references cited above teach the use of a silyl phosphate for inhibiting the ester-carbonate interchange in a polyester-polycarbonate composition.

SUMMARY OF THE INVENTION

The present invention provides a polyester-polycarbonate composition comprising (A) at least one polyester prepared by the reaction of at least one alkenediol with at least one dicarboxylic acid or dialkyl ester thereof in the presence of a metallic catalyst, (B) at least one polycarbonate, and (C) at least one silyl phosphate having the general formula

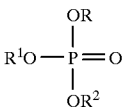

wherein R is hydrogen, an alkyl radical, an aryl radical, an alkylaryl radical, or a radical having the formula $-[(R^3)_2SiO]_a-Si(R^3)_3$ or $-[(R^3)_2SiO]_bH$; $R^1$ is hydrogen, an alkyl radical, an aryl radical, an alkylaryl radical, or a radical having the formula $-[(R^3)_2SiO]_c-Si(R^3)_3$ or $-[(R^3)_2SiO]_dH$; $R^2$ is $-[(R^3)_2SiO]_e-Si(R^3)_3$ or $-[(R^3)_2SiO]_fH$, wherein "a", "b", "c", "d", "e", and "f" are each numbers having a value of from 0 up to a number not exceeding 20, the sum of "a", "b", "c", "d", "e", and "f" ranges from a number greater than 0 to a number not exceeding 20; wherein each $R^3$ is independently a monovalent hydrocarbon radical or a halogenated monovalent hydrocarbon radical, the silyl phosphate being present in an amount effective to inhibit ester-carbonate interchange in the composition.

In the composition and method of this invention, the silyl phosphate substantially deactivates the metallic catalyst residues so that the residues lose their ability to catalyze a transesterification reaction between the polycarbonate and the polyester. In addition, the silyl phosphate will not neutralize acid-sensitive colorants added to the polyester-polycarbonate composition.

DETAILED DESCRIPTION OF THE INVENTION

The term "metallic catalyst" and "metal catalyst" as used herein refers to those metal compounds which are known to be useful as catalysts in the preparation of polyesters. Examples of such catalysts include organic or inorganic compounds of arsenic, cobalt, tin, antimony, zinc, titanium, magnesium, calcium, manganese, gallium, sodium, lithium, and the like. Titanium compounds are frequently used. Examples of these include the tetraalkyl titanates, such as tetraisopropyl titanate and tetra(2-ethylhexyl)titanate. Metallic catalysts useful in the preparation of polyesters are described, for example, in U.S. Pat. No. 4,401,804 (Wooten et al.), which is hereby incorporated by reference herein.

Component A in the composition of this invention is at least one polyester. The polyesters present in the composition and used in the method of this invention are poly (alkylene dicarboxylates), which normally comprise repeating units of the formula

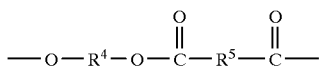 (I)

wherein $R^4$ is a saturated divalent aliphatic, alicyclic, or aryl radical containing about 2 to about 10 carbon atoms and preferably about 2 to about 6 carbon atoms, and $R^5$ is a divalent aliphatic, alicyclic, or aryl radical containing about 2 to about 20 and preferably about 6 to about 20 carbon atoms.

Examples of radicals represented by $R^4$ include ethylene, propylene, trimethylene, pentamethylene, hexamethylene, dimethylenecyclohexane, tetramethylene, and 1,4-cyclohexylene. The straight-chain radicals are preferred, especially ethylene, trimethylene, and tetramethylene, but branched radicals are also contemplated.

The poly(alkylene dicarboxylate) used in this invention is preferably a polyalkylene terephthalate or a polycyclohexylterephthalate. Preferably, it is a polyalkylene terephthalate, and, most preferably, poly(ethylene terephthalate) ("PET") or poly(butylene terephthalate) ("PBT"), with PBT being more preferred than PET. It usually has a number average molecular weight in the range of about 10,000–70,000, as determined by gel permeation chromatography or by intrinsic viscosity at 30° C. in a mixture of 60% (by weight) phenol and 40% 1,1,2,2-tetrachloroethane.

The polyesters used in this invention are prepared by the reaction of at least one alkenediol of the formula HO—$R^4$—OH with at least one dicarboxylic acid of the formula HOOC—$R^5$—COOH or derivatives thereof, such as, for example, dialkyl esters, diacid chlorides, carboxylic acid salts, and diaryl esters. The dicarboxylic acid may be an aliphatic acid such as succinic, glutaric, adipic, sebacic, azelaic, suberic acid, or cyclohexane dicarboxylic acid; or an aromatic acid such as isophthalic acid, terephthalic acid, naphthyl dicarboxylic acid, or biphenyl dicarboxylic acid. The aromatic acids, especially terephthalic acid, are preferred. The use of an ester and especially a lower alkyl ester is preferred, the term "lower alkyl" denoting alkyl groups having up to 7 carbon atoms, preferably, a methyl, ethyl, or butyl ester. The reaction between the alkenediol and the dicarboxylic acid is typically promoted by a metallic catalyst, examples of which were provided previously herein.

Further suitable reagents for forming polyesters are described, for example, in the following U.S. Patent Nos., all of which are hereby incorporated by reference herein: U.S. Pat. Nos. 2,465,319; 2,720,502; 2,727,881; 2,822,348; 3,047,539.

For the preparation of the polyester, the dicarboxylic acid or ester thereof, alkenediol and metallic catalyst are typically heated in the range of about 180–300° C. for a period of time sufficient to produce the desired polyester. The mole ratio of diol to acid or ester is typically from about 1:1 to about 1.4:1 and preferably from about 1.2:1 to about 1.3:1, the excess diol being useful to drive the reaction to completion. The amount of metallic catalyst used is typically about 0.005–0.2 percent by weight, based on the amount of acid or ester.

For component B, the term "polycarbonate" as used herein embraces those polycarbonates comprising repeating units of the formula

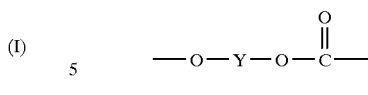 (II)

wherein Y is a divalent aromatic radical derived from a dihydroxyaromatic compound of the formula HO—Y—OH. Typical dihydroxyaromatic compounds are 2,2-bis-(4-hydroxyphenyl)propane, also known as bisphenol A; bis(4-hydroxyphenyl)methane; 2,2-bis(4-hydroxy-3-methylphenyl)propane; 4,4-bis(4-hydroxyphenyl)heptane; 2,2-(3,5,3',5'-tetrachloro-4,4'-dihydroxyphenyl)propane; 2,2-(3,5,3',5'-tetrabromo-4,4'-dihydroxyphenol)propane; 3,3'-dichloro-4,4'-dihydroxydiphenyl)methane; 2,2'-dimethyl-4-methylcyclohexyl bisphenol A; cyclododecyl bisphenol A; cyclohexyl bisphenol, and 2,2'-dihydroxyphenylsulfone, and 2,2'-dihydroxyl phenylsulfide. Most preferably, Y is a 2,2-bis-(4-hydroxyphenyl)propyl radical, in which case, the polycarbonate is a "bisphenol A polycarbonate".

The polycarbonates used in this invention may be prepared by reacting the dihydroxyaromatic compound with a carbonate precursor such as phosgene, a haloformate or a carbonate ester, a molecular weight regulator, an acid acceptor and a catalyst. Methods for preparing polycarbonates are known in the art and are described, for example, in U.S. Pat. No. 4,452,933, which is hereby incorporated by reference herein.

Examples of suitable carbonate precursors include carbonyl bromide, carbonyl chloride, and mixtures thereof; diphenyl carbonate; a di(halophenyl)carbonate, e.g., di(trichlorophenyl) carbonate, di(tribromophenyl) carbonate, and the like; di(alkylphenyl)carbonate, e.g., di(tolyl)carbonate; di(naphthyl)carbonate; di(chloronaphthyl)carbonate, or mixtures thereof; and bis-haloformates of dihydric phenols.

Examples of suitable molecular weight regulators include phenol, cyclohexanol, methanol, alkylated phenols, such as octylphenol, para-tertiary-butyl-phenol, and the like. The preferred molecular weight regulator is phenol or an alkylated phenol.

The acid acceptor can be either an organic or an inorganic acid acceptor. A suitable organic acid acceptor is a tertiary amine and includes such materials as pyridine, triethylamine, dimethylaniline, tributylamine, and the like. The inorganic acid acceptor can be either a hydroxide, a carbonate, a bicarbonate, or a phosphate of an alkali or alkaline earth metal.

The catalyst which can be used are those that typically aid the polymerization of the monomer with phosgene. Suitable catalysts include tertiary amines such as triethylamine, tripropylamine, N,N-dimethylaniline, quanternary ammonium compounds such as, for example, tetraethylammonium bromide, cetyl triethyl ammonium bromide, tetra-n-heptylammonium iodide, tetra-n-propyl ammonium bromide, tetramethyl ammonium chloride, tetra-methyl ammonium hydroxide, tetra-n-butyl ammonium iodide, benzyltrimethyl ammonium chloride and quaternary phosphonium compounds such as, for example, n-butyltriphenyl phosphonium bromide and methyltriphenyl phosphonium bromide.

The polycarbonate may also be a copolyestercarbonate as described in U.S. Pat. Nos. 3,169,121; 3,207,814; 4,194,038; 4,156,069; 4,430,484, 4,465,820, and 4,981,898, all of which are incorporated by reference herein.

Copolyestercarbonates useful in this invention are available commercially. They are typically obtained by the reaction of at least one dihydroxyaromatic compound with a mixture of phosgene and at least one dicarboxylic acid chloride, especially isophthaloyl chloride, terephthaloyl chloride, or both.

The ratio of polyester to polycarbonate is not critical to the present invention, and may be determined by the individual practitioner of this invention. Typically, the weight ratio of polyester to polycarbonate will range from about 99:1 to about 1:99, preferably from about 95:5 to about 5:95, and most preferably is about 50:50.

The silyl phosphates (C) used in this invention have the general formula

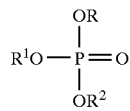
(III)

wherein R is hydrogen, an alkyl radical, an aryl radical, an alkylaryl radical, or a radical having the formula —[($R^3$)$_2$SiO]$_a$—Si($R^3$)$_3$ or —[($R^3$)$_2$SiO]$_b$H; $R^1$ is hydrogen, an alkyl radical, an aryl radical, an alkylaryl radical, or a radical having the formula —[($R^3$)$_2$SiO]$_c$—Si($R^3$)$_3$ or —[($R^3$)$_2$SiO]$_d$H; $R^2$ is —[($R^3$)$_2$SiO]$_e$—Si($R^3$)$_3$ or —[($R^3$)$_2$SiO]$_f$H, wherein "a", "b", "c", "d", "e", and "f" are each numbers having a value of from 0 up to a number not exceeding 20, the sum of "a", "b", "c", "d", "e", and "f" ranges from a number greater than 0 to a number not exceeding 20; wherein each $R^3$ is independently a monovalent hydrocarbon radical or a halogenated monovalent hydrocarbon radical.

Examples of radicals represented by $R^3$ in formula (III) include alkyl radicals, e.g., methyl, ethyl, propyl, butyl, and the like; aryl radicals, e.g., phenyl; halogenated aryl radicals, e.g., chlorophenyl; aralkyl radicals, e.g., phenylethyl; aliphatic, haloaliphatic and cycloaliphatic radicals, e.g., alkenyl, cycloalkyl, haloalkyl. Preferably, $R^3$ is a lower alkyl radical having from 1 to about 7 carbon atoms, e.g., methyl, ethyl, propyl; or a phenyl radical. Most preferably, $R^3$ is methyl.

In preferred embodiments of formula (III), R and $R^1$ are each hydrogen, and $R^2$ is a radical having the formula

wherein e is a number greater than 0 but less than 20, preferably from about 1 to about 15, and most preferably about 9.2.

Therefore, the most preferred silyl phosphate for use in this invention has the formula:

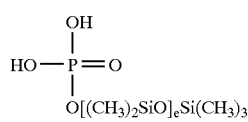
(V)

Frequently, the preparation of the silyl phosphate will yield a mixture of silyl phosphates, wherein the R, $R^1$, and $R^2$ radicals will vary as between the various radicals described above. Typically, such mixtures will comprise a mixture of silyl phosphates, comprising at least one silyl phosphate of the formula

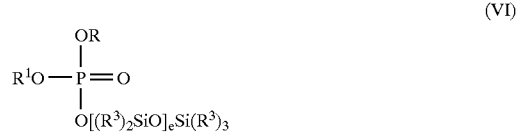
(VI)

and at least one silyl phosphate of the formula

(VII)

wherein the ratio of silyl phosphates of formula (VI) to silyl phosphates of formula (VII) ranges from about 99:1 to about 1:99, preferably from about 10:1 to about 1:10, and most preferably about 2.85:1; "e" and "f" are each numbers ranging from 0 to a number not exceeding 20, and the sum of "i" and "j" ranges from a number greater than 0 to a number not exceeding 20, preferably from about 1.0 to about 15, and most preferably about 9.2.

Silyl phosphates represented by Formula (III) above can be prepared according to methods known in the art. Reference is made, for example, to U.S. Pat. Nos. 5,041,586 (Beck et al.) and 4,125,551 (Peterson), which are each hereby incorporated by reference herein.

In the method disclosed in the patent to Beck et al., silyl phosphates are prepared by heating hexamethyldisiloxane to reflux in a closed container equipped with a condenser means, a water trapping means, and a controllable addition means, the hexamethyldisiloxane at reflux existing with a liquid phase and a vapor phase in equilibrium in the closed container, slowly adding phosphoric acid to the hexamethyldisiloxane liquid phase with the controllable addition means while maintaining reflux, the phosphoric acid addition is continued until 40 to 65 parts by weight are added per 100 parts by weight of hexamethyldisiloxane, collecting by-produced water with the water trapping means and removing the collected water at a rate sufficient to keep the water from returning to the liquid phase hexamethyldisiloxane, allowing the temperature of the liquid phase hexamethyldisiloxane to increase to a temperature in the range of 150° C. to 190° C. after the addition of the phosphoric acid is completed.

In the method described in the Peterson patent, silyl phosphates are prepared by reacting appropriate amounts of phosphoric acid, cyclotetrasiloxane and hexamethyldisiloxane. In this method, the hexamethyldisiloxane is equilibrated with phosphoric acid and the cyclotetrasiloxane, during which water is removed to drive the reaction to completion. The reaction is reversible and complete removal of water is important to the success of the process and minimization of OH-chainstopping. Preferably, a small quantity of the silyl phosphate is added to the reaction mixture to improve control of the reaction. The reaction is autocatalytic and the presence of a small quantity of the silyl phosphate as a seed will promote the smoothness of the reaction's progress.

The silyl phosphate is added to the polymeric composition in an effective amount, i.e., that amount which is effective to deactivate the metallic catalyst residues present in the polymer composition and thereby inhibit the ester-carbonate interchange in the polyester-polycarbonate composition. Typically, this amount will be from about 0.05 to about 5.0, preferably from about 0.1 to about 1.0, and most preferably from about 0.2 to about 0.3, % by weight based on the combined weight of the polycarbonate and polyester resins.

The silyl phosphate used in the present invention can be mixed with the polycarbonate and polyester resins by any suitable means which are well known to those skilled in the art. For example, the polyester and the silyl phosphate may be pre-extruded prior to blending with the polycarbonate. In this method, the metallic catalyst residues are quenched prior to contact with the polycarbonate.

The composition of this invention may further comprise (D) an inorganic or organic colorant, e.g., a dye or pigment.

The silyl phosphate are particularly advantageous for purposes of the present invention in that they do not neutralize acid-sensitive organic and inorganic colorants added to the composition herein, therefore, allowing the polycarbonate-polyester composition to retain the desired color. Examples of acid-sensitive colorants include the Ultramarine pigments, e.g., Ultramarine Blue; Ultramarine Violet; C.I. Pigment Red 187; and C.I. Pigment Red 187. It is to be understood, however, that, although the silyl phosphates are advantageous in compositions containing acid sensitive colorants, the silyl phosphates can also be used in compositions containing non-acid sensitive organic and inorganic colorants.

The polymeric composition of this invention may further contain (E) one or more agents to improve the impact strength, i.e., an impact modifier.

So-called core-shell polymers built up from a rubber-like core on which one or more shells have been grafted are preferably used. The core usually consists substantially of an acrylate rubber or a butadiene rubber. One or more shells have been grafted on the core. Usually these shells are built up for the greater part from a vinylaromatic compound and/or a vinylcyanide and/or an alkyl(meth)acrylate and/or (meth)acrylic acid. The core and/or the shell(s) often comprise multi-functional compounds which may act as a cross-linking agent and/or as a grafting agent. These polymers are usually prepared in several stages.

Olefin-containing copolymers such as olefin acrylates and olefin diene terpolymers can also be used as impact modifiers in the present compositions. An example of an olefin acrylate copolymer impact modifier is ethylene ethylacrylate copolymer available from Union Carbide as DPD-6169. Other higher olefin monomers can be employed as copolymers with alkyl acrylates, for example, propylene and n-butyl acrylate. The olefin diene terpolymers are well known in the art and generally fall into the EPDM (ethylene propylene diene) family of terpolymers. They are commercially available such as, for example, EPSYN 704 from Copolymer Rubber Company. They are more fully described in U.S. Pat. No. 4,559,388, incorporated by reference herein.

Various rubber polymers and copolymers can also be employed as impact modifiers. Examples of such rubbery polymers are polybutadiene, polyisoprene, and various other polymers or copolymers having a rubbery dienic monomer.

Styrene-containing polymers can also be used as impact modifiers. Examples of such polymers are acrylonitrile-butadiene-styrene, styrene-acrylonitrile, acrylonitrile-butadiene-alpha-methylstyrene, styrene-butadiene, styrene butadiene styrene, diethylene butadiene styrene, methacrylate-butadiene-styrene, high rubber graft ABS, and other high impact styrene-containing polymers such as, for example, high impact polystyrene. Other known impact modifiers include various elastomeric materials such as organic silicone rubbers, elastomeric fluorohydrocarbons, elastomeric polyesters, the random block polysiloxane-polycarbonate copolymers, and the like. The preferred organopolysiloxane-polycarbonate block copolymers are the dimethylsiloxane-polycarbonate block copolymers.

The compositions of this invention may further contain (F) one or more stabilizers to protect the polymers from degradation due to heat or radiation by ultraviolet light. The term "stabilizers" as it relates to component (F) does not include the silyl phosphates described earlier herein. Satisfactory stabilizers for use as component (F) in the compositions of this invention comprise phenols and their derivatives, amines and their derivatives, compounds containing both hydroxyl and amine groups, polymeric phenolic esters and salts of multivalent metals in which the metal is in its lower state.

Representative phenol derivatives useful as stabilizers include 3,5-di-tert-butyl-4-hydroxy hydrocinnamic triester with 1,3,5-tris-(2-hydroxy ethyl-s-triazine-2,4,6-(1H,3H, 5H)trione; 4,4'-bis(2,6-ditertiary-butylphenyl); 1,3,5-trimethyl-2,4,6-tris(3,5-ditertiary-butyl-4-hydroxybenzyl) benzene and 4,4'-butylidene-bis (6-tertiary-butyl-m-cresol). Mixtures of hindered phenols with esters of thiodipropionic acid, mercaptides and phosphite esters are particularly useful. Additional stabilization to ultraviolet light can be obtained by compounding with various UV absorbers such as substituted benzophenones and/or benzotriazoles.

It is also within the scope of the invention to incorporate ingredients such as reinforcing fibers, plasticizers, mold release agents, flame retardants, antioxidants, fillers such as clay, talc, and mica, and the like into the polycarbonate-polyester composition.

The polymeric composition of this invention can be obtained according to any conventional method of preparing polymer mixtures. The individual constituents are preferably mixed collectively in the melt (compounded) in an extruder. The extrudate (in strand form) which emanates from the extruder is chopped to pellets. The pellets may, for example, be further processed in an injection molding machine.

The present invention is also directed to a method for inhibiting the ester-carbonate interchange in a polyester-polycarbonate composition comprising components (A) and (B) described hereinabove, wherein the method comprises contacting the polyester-polycarbonate composition with (C) at least one silyl phosphate described hereinabove and present in an amount effective to inhibit ester-carbonate interchange in the composition, which are those amounts also provided hereinabove.

The following examples illustrate the present invention, but are not intended to limit the scope of the claims in any manner whatsoever. All parts are by weight unless otherwise specified.

EXPERIMENTAL

In the examples below, the following terms have the meanings set forth below:

PBT - a poly(butylene terephthalate) having a number average molecular weight, as determined by gel permeation chromatography, of about 50,000 and a melt viscosity of about 8500 poise at 2500. Commercially available from General Electric Company under the designation VALOX (Registered Trademark) 315.

PC - a bisphenol A polycarbonate having a weight average molecular weight of about 68,000 and a melt flow of about 9.5 grams per 10 minutes at 300° C. Commercially available from General Electric Company under the designation LEXAN (Registered Trademark) 145.

Silyl Phosphate - a mixture of silyl phosphates comprising at least one silyl phosphate of the formula

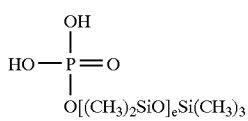

(VIII)

and at least one silyl phosphate of the formula

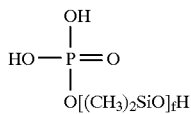

(IX)

wherein the ratio of silyl phosphates of formula (VIII) to silyl phosphates of formula (IX) is about 2.85:1, e and f are numbers such that the sum of i and j is approximately 9.2, and the viscosity of the mixture of silyl phosphates being about 400 to about 800 centistokes at 25° C.

MBS - a methacrylate butadiene styrene impact modifier available from Rohm & Haas Co. under the designation Paraloid (Registered Trademark) EXL 2691.

HRG-ABS - a high rubber graft acrylonitrile butadiene styrene impact modifier available from General Electric Company under the designation Blendex (Registered Trademark) 338.

Examples 1–3 and Comparative Examples A and B illustrate the increased deactivation of the catalyst residues which results from the use of Silyl Phosphate (Examples 1–3) compared to the use of phosphorous acid (Comparative Example A) or nothing at all (Comparative Example B).

EXAMPLES 1–3 AND COMPARATIVE EXAMPLES A AND B

Five compositions were prepared by co-extruding PC and PBT in a vacuum-vented 30 mm WP twin screw operated at 480° F. (zone 1); 480° F. (zone 2); 480° F. (zone 3); 480° F. (zone 4); 480° F. (zone 5); and 480° F. (zone 6). Each composition contained a PC/PBT weight ratio of 50:50.

Silyl Phosphate was added to the compositions prepared in Examples 1–3 in the amount of 0.1, 0.25, and 0.5 parts by weight, respectively, per 100 parts of the respective compositions. For comparison purposes, 0.15 part by weight of 45% aqueous phosphorous acid was added to 100 parts by weight of the composition in Comparative Example A, and no additives were added to the composition in Comparative Example B.

The degree of transesterification which occurred in the samples was determined by measuring the samples' vicat softening points under standard and abusive vicat testing conditions and crystalline melting points under abusive testing conditions.

The vicat softening points of the five samples were determined according to the procedure described in ASTM D 1525-58T, wherein the vicat softening point is the temperature at which a flat ended needle of one square millimeter circular or square cross-section will penetrate a thermoplastic specimen to a depth of one millimeter under a specified load using a uniform rate of temperature rise. In the case of the examples below, the rate of temperature rise was 2 degrees centigrade per minute and the load was 8 pounds 15 ounces.

For measurement of their vicat softening points under standard vicat testing conditions, the samples were prepared on an 80 ton molding machine at 480° F. for a cycle time of 30 seconds.

For measurement of their vicat softening points under abusive testing conditions, the samples were prepared on an 80 ton molding machine at 550° F. for a cycle time of 2 minutes.

The crystalline melting points of the samples under abusive conditions were measured by bringing the samples to a temperature of 40° C. and then heating the samples to a temperature of about 290° C. at the rate of 20° C. per minute. The samples were maintained at 290° C. for about 15 minutes and then cooled to a temperature of 40° C. at the rate of 80° C. per minute. The samples were held at 40° C. for 10 minutes and then heated again to 290° C. at the rate of 20° C. per minute. The crystalline melting point was measured after the second heating to 290° C.

The vicat softening points under standard and abusive conditions and crystalline melting points under abusive conditions of the samples are shown in Table 1 below. In the tables below, "VSP" refers to vicat softening point, "Std" refers to standard conditions, "Ab" refers to abusive conditions, and "Tm" refers to crystalline melting points.

TABLE 1

Vicat Softening Points
Examples 1–3 and Comparative Examples A and B

| Example | VSP(°F.) (Std) | VSP(°F.) (Ab) | Tm(°C.) (Ab) |
| --- | --- | --- | --- |
| 1 | 271 | 246 | 213 |
| 2 | 274 | 253 | 223 |
| 3 | 272 | 257 | 224 |
| A | 272 | 256 | 223 |
| B | 271 | 154 | 194 |

The substantial lowering of vicat softening points and crystalline melting points of the sample of Comparative Example B indicates that transesterification has occurred in that composition. The relatively high softening points and crystalline melting points of the samples prepared in Examples 1–3 and Comparative Example B indicate that the Silyl Phosphate and phosphorous acid are comparable in preventing transesterification. The low vicat softening points and crystalline melting points of the sample prepared in Comparative Example B indicates that transesterification has occurred in that composition. Comparative B illustrates that transesterification will occur in the absence of a catalyst residue-deactivating additive.

EXAMPLE 4 AND COMPARATIVE EXAMPLE C

In Example 4 and Comparative Example C, two compositions each containing 50 parts by weight of PC and 50 parts by weight of PBT, were prepared as described in the examples above. To each composition was added 0.1 parts by weight of the pigment, Ultramarine Blue. Silyl phosphate at 0.1 parts by weight was added to the composition of Example 4, and phosphorous acid at 0.15 parts by weight was added to the composition of Comparative Example C.

The degree of transesterification taking place in each of the compositions prepared in Example 4 and Comparative Example C was determined in part by measuring the vicat softening points of the compositions under abusive conditions using the same procedure described in Examples 1–3 and Comparative Examples A and B above, wherein samples of the materials were prepared on an 80 ton molding machine at 550° F. for a cycle time of 2 minutes. In addition, the degree of transesterification was determined by visually observing and noting the color change, if any, and the degree of transparency of the compositions prepared in Example 4 and Comparative Example C. The results are shown in Table 2 below.

TABLE 2

Vicat Softening Points, Color, and Transparency Properties Example 4 and Comparative Example C

| Example | VSP (°F.) (Ab) | Color | Transparency |
|---|---|---|---|
| 4 | 124 | Blue | No |
| C | — | Green | Yes |

In Example 4, the composition retained its blue color, meaning that the silyl phosphate did not quench the pigment. Furthermore, the lack of transparency indicates that transesterification did not occur, which means that, in the presence of an acid-sensitive pigment, silyl phosphate still prevents transesterification in a polycarbonate/polyester composition.

In Comparative Example C, the composition became green after extrusion, meaning that the phosphorous acid reacted with the pigment. The transparency of the composition indicates that transesterification occurred, which means that, in the presence of an acid-sensitive pigment, phosphorous acid did not prevent transesterification in this polycarbonate/polyester composition.

EXAMPLE 5 AND COMPARATIVE EXAMPLE D

In Example 5 and Comparative Example C, two compositions were prepared, each containing 39 parts by weight of PC, 46 parts by weight of PBT, and 14 parts by weight of MBS. To the composition of Example 5 were added 0.65 parts by weight of stabilizers and 0.5 part by weight of Silyl Phosphate. In Comparison Example D, 0.6 part by weight of stabilizers and no silyl phosphate were added to the composition. A sample of each composition was prepared on an 80 ton molding machine at 550° F. for a cycle time of 2 minutes.

The Vicat softening points, abusive vicat, and crystalline melting points of the two samples were measured using the same procedures followed in the examples hereinabove. The results are set forth in Table 3.

TABLE 3

Vicat Softening Points, Abusive Vicat, and Crystalline Melting Points Example 5 and Comparative Example D

| Example | Vicat Softening Point (°F.) | Abusive Vicat (°F.) | Tm (°C.) |
|---|---|---|---|
| 5 | 242.2 | 229.5 | 224.3 |
| D | - - -* | - - -* | No Tm observed |

*Unable to obtain data, sample could not be molded

Instability of the composition of Comparative Example D is evidenced by the fact that no Tm was observed.

EXAMPLE 6 AND COMPARATIVE EXAMPLE E

In Example 6 and Comparative Example E, two compositions were prepared, each containing 39 parts by weight of PC, 46 parts by weight of PBT, and 14 parts by weight of HRG ABS. To the composition of Example 6 were added 0.65 part by weight of thermal stabilizers and 0.5 part by weight of Silyl Phosphate. In Comparison Example E, 0.6 part by weight of thermal stabilizers and no Silyl Phosphate were added to the composition. A sample of each composition was prepared on an 80 ton molding machine at 550° F. for a cycle time of 2 minutes.

The vicat softening points, abusive vicat, and crystalline melting points of the two samples were measured using the same procedures followed in the examples hereinabove. The results are set forth in Table 4.

TABLE 4

Vicat Softening Points, Abusive Vicat, and Crystalline Melting Points Example 6 and Comparative Example E

| Example | Vicat Softening Point (°F.) | Abusive Vicat (°F.) | Tm(°C.) |
|---|---|---|---|
| 6 | 250.2 | 234 | 224 |
| E | 246 | 191 | 204.6 |

The substantial lowering of vicat softening points and crystalline melting points of the sample of Comparative Example E indicates that transesterification has occurred in that composition, which did not contain Silyl Phosphate, while the composition which did contain Silyl Phosphate did not undergo transesterification.

The foregoing examples illustrate that the silyl phosphates used in this invention substantially prevent transesterification in polyester-polycarbonate compositions.

What is claimed is:

1. A polyester-polycarbonate composition comprising (A) at least one polyester prepared by the reaction of at least one alkenediol with at least one dicarboxylic acid or dialkyl ester thereof in the presence of a metallic catalyst, (B) at least one polycarbonate, and (C) at least one silyl phosphate having the general formula

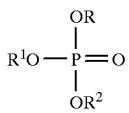

wherein R is hydrogen, an alkyl radical, an aryl radical, an alkylaryl radical, or a radical having the formula $—[(R^3)_2SiO]_a—Si(R^3)_3$ or $—[(R^3)_2SiO]_bH$; $R^1$ is hydrogen, an alkyl radical, an aryl radical, an alkylaryl radical, or a radical having the formula $—[(R^3)_2SiO]_c—Si(R^3)_3$ or $—[(R^3)_2SiO]_dH$; $R^2$ is $—[(R^3)_2SiO]_e—Si(R^3)_3$ or $—[(R^3)_2SiO]_fH$, wherein "a", "b", "c", "d", "e", and "f" are each numbers having a value of from 0 up to a number not exceeding 20, the sum of "a", "b", "c", "d", "e", and "f" ranges from a number greater than 0 to a number not exceeding 20; wherein each $R^3$ is independently a monovalent hydrocarbon radical or a halogenated monovalent hydrocarbon radical, the silyl phosphate being present in an amount effective to inhibit ester-carbonate interchange in the composition.

2. A composition according to claim 1 wherein $R^3$ is a lower alkyl radical having from 1 to about 7 carbon atoms or a phenyl radical.

3. A composition according to claim 2 wherein $R^3$ is a methyl radical.

4. A composition according to claim 2 wherein R and $R^1$ are each hydrogen and $R^2$ is a radical having the formula $—[(CH_3)_2SiO]_eSi(CH_3)_3$, where "e" is a number ranging from about 1 to about 15.

5. A composition according to claim 4 wherein the average value for e is equal to about 9.2.

6. A composition according to claim 1, wherein (C) is a mixture of silyl phosphates comprising at least one silyl phosphate of the formula

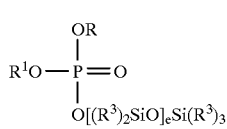
(VI)

and at least one silyl phosphate of the formula

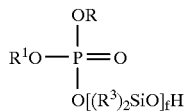
(VII)

wherein the ratio of silyl phosphates of formula (VI) to silyl phosphates of formula (VII) ranges form about 99:1 to about 1:99, e and f are each numbers ranging from 0 to a number not exceeding 20, and the sum of e and f ranges from a number greater than 0 to a number not exceeding 20.

7. A composition according to claim 6 wherein the ratio of silyl phosphates of formula (VI) to silyl phosphates of formula (VII) ranges from about 10:1 to about 1:10 and the sum of e and f is a number ranging from about 1 to about 15.

8. A composition according to claim 7 wherein the ratio of silyl phosphates of formula (VI) to silyl phosphates of formula (VII) is about 2.85:1 and the sum of e and f is about 9.2.

9. A composition according to claim 1 wherein the amount of silyl phosphate is from about 0.05% to about 5.0% by weight based on the combined weight of the polycarbonate and the polyester.

10. A composition according to claim 9 wherein the amount of silyl phosphate is from about 0.1% to about 1.0% by weight based on the combined weight of the polycarbonate and the polyester.

11. A composition according to claim 10 wherein the amount of silyl phosphate is from about 0.2% to about 0.3% by weight based on the combined weight of the polycarbonate and the polyester.

12. A composition according to claim 1 wherein the polycarbonate is a bisphenol A polycarbonate and the polyester is polybutylene terephthalate.

13. A composition according to claim 1 wherein the metallic catalyst is an organic or inorganic compound selected from the group comprising organic or inorganic compounds of arsenic, cobalt, tin, antimony, zinc, titanium, magnesium, calcium, manganese, gallium, sodium, and lithium.

14. A composition according to claim 13 wherein the metallic catalyst is a titanium compound.

15. A composition according to claim 14 wherein the titanium compound is tetraisopropyl titanate or tetra(2-ethylhexyl)titanate.

16. A composition according to claim 1 further comprising (D) an organic or inorganic colorant.

17. A composition according to claim 16 wherein the colorant is acid-sensitive.

18. A composition according to claim 17 wherein the colorant is selected from Ultramarine Blue, Ultramarine Violet, C.I. Pigment Red 68, or C.I. Pigment Red 187.

19. A composition according to claim 1 further comprising (E) one or more impact modifiers.

20. A composition according to claim 1 further comprising (F) one or more stabilizers.

21. A method for inhibiting the ester-carbonate interchange in a polyester-polycarbonate composition comprising (A) at least one polyester prepared by the reaction of at least one alkenediol with at least one dicarboxylic acid or dialkyl ester thereof in the presence of a titanium compound as catalyst and (B) at least one polycarbonate; wherein the method comprises contacting the polyester-polycarbonate composition with (C) at least one silyl phosphate having the general formula

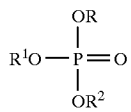

wherein R is hydrogen, an alkyl radical, an aryl radical, an alkylaryl radical, or a radical having the formula —[(R$^3$)$_2$SiO]$_a$—Si(R$^3$)$_3$ or —[(R$^3$)$_2$SiO]$_b$H; R$^1$ is hydrogen, an alkyl radical, an aryl radical, an alkylaryl radical, or a radical having the formula —[(R$^3$)$_2$SiO]$_c$—Si(R$^3$)$_3$ or —[(R$^3$)$_2$SiO]$_d$H; R$^2$ is —[(R$^3$)$_2$SiO]$_e$—Si(R$^3$)$_3$ or —[(R$^3$)$_2$SiO]$_f$H, wherein "a", "b", "c", "d", "e", and "f" are each numbers having a value of from 0 up to a number not exceeding 20, the sum of "a", "b", "c", "d", "e", and "f" ranges from a number greater than 0 to a number not exceeding 20; wherein each R$^3$ is independently a monovalent hydrocarbon radical or a halogenated monovalent hydrocarbon radical, the silyl phosphate being present in an amount effective to inhibit ester-carbonate interchange in the composition.

22. A polyester-polycarbonate composition comprising:

(A) a polybutylene terephthalate prepared by the reaction of butanediol with at least one terephthalic acid or dialkyl ester thereof in the presence of a titanium compound catalyst;

(B) at least one bisphenol A polycarbonate;

(C) at least one silyl phosphate;

(D) an acid sensitive inorganic or organic colorant; and (E) an impact modifier; wherein the silyl phosphate (C) has the general formula

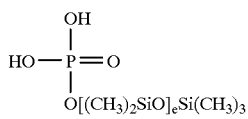

wherein e is about 9.2, the amount of silyl phosphate ranging from about 0.2% to about 0.3% by weight based on the combined weight of bisphenol A polycarbonate and the polybutylene terephthalate.

* * * * *